May 7, 1940.                  G. A. KREITLER                  2,199,499
                              GEOGRAPHICAL GAME
                           Filed June 9, 1939           2 Sheets-Sheet 1
Fig. 1
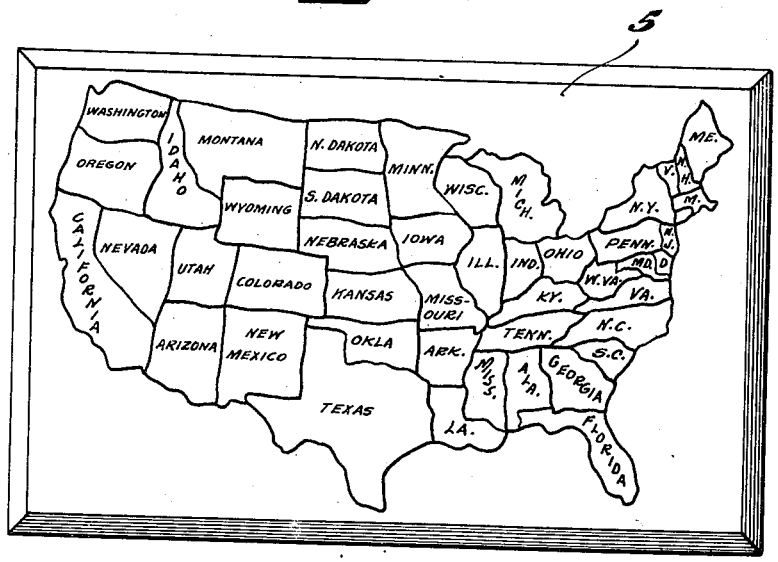
Fig. 2
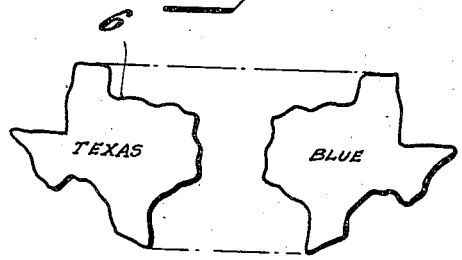
Fig. 3
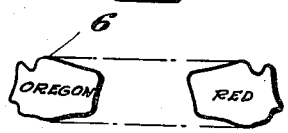
Fig. 5
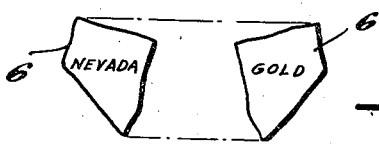
Fig. 4
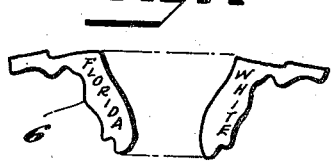
Fig. 6   Fig. 7
 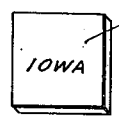
Fig. 8   Fig. 9
 
Inventor
GEORGE A. KREITLER
By Lacey & Lacey
Attorneys May 7, 1940.  G. A. KREITLER  2,199,499
GEOGRAPHICAL GAME
Filed June 9, 1939  2 Sheets-Sheet 2

Fig. 10

| | | | |
|---|---|---|---|
| Maine | Maine | Maine | Maine |
| Ohio | Ohio | Ohio | Ohio |
| Nevada | Nevada | Nevada | Nevada |
| Texas | Texas | Texas | Texas |
| Utah | Utah | Utah | Utah |
| Iowa | Iowa | Iowa | Iowa |
| Oregon | Oregon | Oregon | Oregon |
| New York | New York | | |
| Kansas | | | |
| Florida | | | |
| Georgia | | | |

Inventor
GEORGE A. KREITLER
By Lacey & Lacey, Attorneys

Patented May 7, 1940

2,199,499

UNITED STATES PATENT OFFICE 2,199,499

GEOGRAPHICAL GAME

George A. Kreitler, Greenwich, Conn.

Application June 9, 1939, Serial No. 278,343

2 Claims. (Cl. 35—42)

This invention relates to games and more particularly to a geographical cut-out game.

The object of the invention is to provide a comparatively simple and inexpensive game of the character described particularly designed to be played by children to familiarize them with the names and location of the different States of the Union or other geographical entity, thereby providing a source of entertainment as well as an educational feature.

A further object of the invention is to provide a game including a pattern sheet bearing suitable indicia and a plurality of sets of individual playing sections or cut-outs having indicia corresponding to the indicia on the pattern sheet so as to enable a child to assemble the sections or cut-outs to conform to the outline on the pattern sheet and the indicia thereon.

A further object is to provide a proof-sheet having the names of the different States of the Union printed thereon and arranged in columns in like sequence, each column being designated by a distinctive color corresponding to the color of the sets of playing sections or cut-outs and further to provide a series of playing blocks or disks corresponding in color and name to the indicia on the proof-sheet and adapted to be removed from a container at random by the monitor of the game for determining the respective moves of the cut-outs of the different players.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a plan view of the pattern sheet employed in playing the game,

Figure 2 is a plan view showing the front and rear faces of one of the cut-outs of one set of playing sections and designated "Blue,"

Figure 3 is a similar view of the cut-outs of another set and designated "Red,"

Figure 4 is a similar view of one of the cut-outs of another set and designated "White,"

Figure 5 is a similar view of one of the cut-outs constituting the fourth set and designated "Gold,"

Figures 6, 7, 8 and 9 are plan views of the indicating blocks or disks,

Figure 10 is a plan view of a portion of the proof-sheet.

In carrying the invention into effect, I provide a pattern sheet 5 of any desired shape and size and preferably formed of paper or similar material. The pattern sheet 5 may have printed or otherwise represented thereon any selected geographical design, but it is preferable that the design follow the outline of the map of the United States with the names of the different States of the Union designated thereon, as shown.

In connection with the pattern sheet 5, I provide a plurality of sets of playing sections or cut-outs 6 conforming in outline to the respective States of the Union. Four separate sets of playing sections or cut-outs are preferably employed, although any desired number of sets may be used. The playing sections or cut-outs of the several sets conform in outline to the contour of the different States of the Union, as previously stated, and each cut-out of each set will have printed on one face thereof the name of one of the States of the Union and on the other side thereof a distinctive color. As shown in Figures 2 to 5 inclusive of the drawings, the playing sections or cut-outs of one set will each have one face thereof designated "Blue," the cut-outs of another set designated "Red," the cut-outs of the third set designated "White" and the cut-outs of the fourth set designated "Gold."

When used as a picture puzzle, the child places the pattern sheet 5 in a convenient position on a table or other support and after selecting playing sections or cut-outs of the desired color assembles said cut-outs to form the map of the United States, using the pattern sheet 5 as a guide. In this manner the child becomes familiar not only with the names of the different States of the Union but also the location of said States. If desired, however, instead of having the names of States printed on the cut-outs, said cut-outs may have the letters of the alphabet printed thereon or suitable pictorial illustrations, such as wild or domestic animals.

When the device is used as a game or educational feature for children, I provide a proof-sheet 7, in addition to the pattern sheet, on which are printed the names of the different States of the Union, said names being arranged in a series of independent columns 8, each column bearing the names of all the States of the Union and the names in the several columns being arranged in like order or sequence. At the upper portion of the proof-sheet 7 immediately above each column 8 of names is a panel 9 bearing a distinctive color, one column being designated "Red," another "White," another "Blue" and another "Gold" to correspond with the colors of the different sets of cut-outs. I further provide a plurality of playing blocks or disks 10 corresponding in number and color to the cut-outs of the different sets of playing sections and each block or disk having printed or otherwise represented on the colored face thereof the name of one of the States of the Union.

When the device is used as a game, a monitor is appointed who, at the start of the game, places all of the playing blocks or disks in a box or other receptacle. If, for example, four children are playing the game, each child is given a set of the cut-outs or playing sections bearing a certain color. The monitor then reaches in the box or container and removes one of the playing or indicating blocks or disks therefrom and calls out the name of the State appearing on the face thereof and also the color and at the same time places the selected block or disk over the name of the State on the proof-sheet in that column having the designating color corresponding to the color on the disk. The player whose color has been called then selects one of his cut-outs corresponding to the color and name on the playing disk held by the monitor and places it on the table and, as the several playing disks are successively withdrawn from the box by the monitor, the different players will assemble their respective cut-outs to form a design corresponding to the pattern sheet. The first child who completes his pattern or design is declared the winner. The proof-sheet enables the monitor to verify each move of the several players so that there can be no mistake or confusion in playing the game.

A game constructed and played in the manner described will not only form a source of diversion and entertainment for young children but will also familiarize the children with geography and thereby impart to the game an educational feature.

Having thus described the invention, what is claimed as new is:

1. A game of the class described comprising a pattern sheet having a sectional design thereon representing a selected geographical area, each section of which bears the name of a particular portion of said area, a plurality of sets of individual cut-outs conforming in outline to the sections of the design on the pattern sheet, each set of cut-outs having a different color and the cut-outs of each section being provided with a name corresponding to the name on one of the design sections, a proof-sheet having a plurality of names corresponding to the names on the cut-outs printed thereon and arranged in separate columns, each column being designated by a color corresponding to the color of one set of cut-outs and the names in the different columns being the same and arranged in like sequence, and a plurality of movable playing pieces having colors corresponding to the colors on the proof-sheet and cut-outs respectively and bearing names corresponding to the names on the cut-outs and pattern sheet, said cut-outs being adapted to be assembled to conform to the geographical design on the pattern sheet and said playing pieces being adapted to be positioned on the proof-sheet to determine the assembly of said cut-outs by a player.

2. A game of the class described comprising a pattern sheet having a sectional design of the United States represented thereon, each section of the design having the name of one of the States represented thereon, a plurality of sets of individual cut-outs conforming in outline to the sections of the design on the pattern sheet, each set being of a different color and the cut-outs of each set being provided with the name of one of the States, a proof-sheet having the names of the several States printed thereon and arranged in vertical columns, each column bearing the same names arranged in like sequence and each column being provided with a designating color corresponding to the colors of the different sets of cut-outs, and a plurality of movable playing pieces having colors corresponding to the colors of the different sets of cut-outs and each having printed thereon the name of a State, said cut-outs being adapted to be assembled to conform to the design on the pattern sheet and said playing pieces being adapted to be positioned over the names in the different columns on the proof-sheet in accordance with the color of the playing pieces for determining the assembly of said cut-outs by the player.

GEORGE A. KREITLER.